United States Patent
Borne et al.

(10) Patent No.: US 7,078,646 B2
(45) Date of Patent: Jul. 18, 2006

(54) WIRE-GUIDE/NOZZLE ASSEMBLY FOR A ROBOTIC TIG WELDING TORCH

(75) Inventors: André Borne, Bessancourt (FR); Jean-Marie Fortain, Osny (FR)

(73) Assignees: L'Air Liquide, Société Anonyme à Directoire et Conseil de Surveillance pour l'Etude et l'Exploitation des Procédés Georges Claude, Paris (FR); La Soudure Autogène Française, Paris (FR)

( * ) Notice: Subject to any disclaimer, the term of this patent is extended or adjusted under 35 U.S.C. 154(b) by 18 days.

(21) Appl. No.: 10/798,761

(22) Filed: Mar. 11, 2004

(65) Prior Publication Data

US 2004/0195212 A1    Oct. 7, 2004

(30) Foreign Application Priority Data

Mar. 17, 2003   (FR) ................................. 03 03237

(51) Int. Cl.
B23K 9/167    (2006.01)

(52) U.S. Cl. ........................................ 219/75

(58) Field of Classification Search ................ 219/75, 219/136, 137.7
See application file for complete search history.

(56) References Cited

U.S. PATENT DOCUMENTS

| | | | |
|---|---|---|---|
| 2,791,673 A | 5/1957 | Arnaud | |
| 3,588,464 A * | 6/1971 | Saenger, Jr. et al. | 219/75 |
| 3,617,688 A * | 11/1971 | Fogelstrom | 219/137.7 |
| 4,233,489 A | 11/1980 | Essers | |
| 4,531,040 A | 7/1985 | Nawa et al. | |
| 4,532,406 A * | 7/1985 | Povlick et al. | 219/75 |
| 4,879,446 A * | 11/1989 | Morgan et al. | 219/75 |
| 4,924,053 A * | 5/1990 | Morgan et al. | 219/75 |
| 5,512,726 A | 4/1996 | Arantes et al. | |
| 5,981,897 A | 11/1999 | Offer et al. | |

FOREIGN PATENT DOCUMENTS

| | | |
|---|---|---|
| DE | 35 42 984 | 6/1987 |
| FR | 2 723 330 A | 2/1996 |

OTHER PUBLICATIONS

European Search Report for EP 04 30 0144.
Patent Abstracts of Japan; publication No. 11104839; publication date Apr. 20, 1999; application date Sep. 30, 1997; application No. 09266239.
Patent Abstracts of Japan; publication No. 11104841; publication date Apr. 20, 1999; application date Oct. 1, 1997; application No. 09284605.

* cited by examiner

*Primary Examiner*—Clifford C. Shaw
(74) *Attorney, Agent, or Firm*—Linda K. Russell; Elwood Haynes

(57) ABSTRACT

A wire-guide/nozzle assembly for an electric arc welding torch, with at least one nozzle for delivering gas and at least one wire-guide system for guiding at least one consumable wire, distinguished in that the downstream end of the wire-guide system runs into the nozzle. The peripheral wall of the nozzle has at least one cut-out through which the wire-guide system passes. The wire-guide system is fastened to the nozzle. A TIG welding torch utilizing such a wire-guide/nozzle assembly.

15 Claims, 5 Drawing Sheets

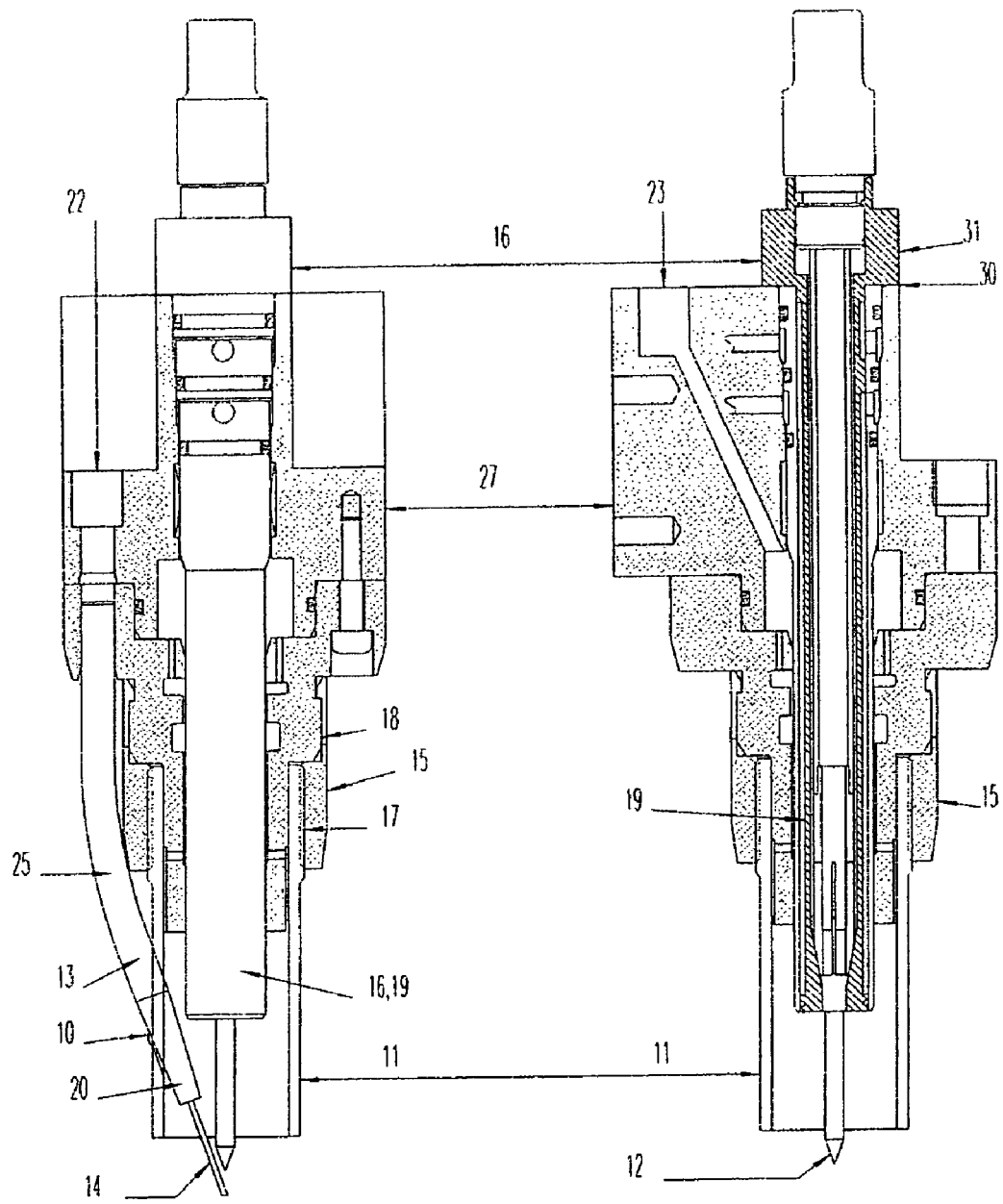

WIRE-GUIDE/NOZZLE ASSEMBLY FOR A ROBOTIC TIG WELDING TORCH

This application claims the benefit of priority under 35 U.S.C. § 119 (a) and (b) 1 to French Application No. 0303237, filed Mar. 17, 2003, the entire contents of which are incorporated herein by reference.

BACKGROUND OF THE INVENTION

1. Field of the Invention

The present invention relates to an automatic TIG welding torch with an integrated consumable-wire feed dedicated to robotic welding.

2. Related Art

A TIG (Tungsten Inert Gas) welding torch fed with welding wire conventionally is in the form of a one-piece body provided with internal arrangements suitable for implementing the welding process to which this torch is dedicated.

Torches may be straight or bent, that is to say the beam leaves along the axis of the torch in the case of a straight torch or perpendicular to the axis of the torch in the case of a bent torch.

In the rear part of the torch, usually called the torch support or mounting, there are flexible or semi-rigid fluid feed lines that are connected to the torch body by a connection system specific to each type of line.

The power supply cables are grouped together by mechanical means, usually by screwing them to the corresponding circuits of the torch, except in the case of liquid- or gas-cooled cables, which are therefore attached appropriately.

A flexible tubular sheath, attached to the rear of the torch by a clip or the like, groups together the cable bundle so as to protect it.

The front part of the torch, again called the torch body, comprises a nozzle for delivering the shielding gas, which nozzle is attached to the torch body by screwing or by any other gripping or similar system, and also an electrode.

The nozzle may be made of metal and may or may not be cooled by a cooling fluid, such as water or a gas; in this case, the nozzle must be electrically insulated from the torch body.

However, the nozzle may also be made of a suitable uncooled insulating material, for example a ceramic.

Moreover, the electrode, usually made of pure tungsten or thoriated tungsten, is held centred in the torch body by a gripping system or the like, in such a way that the nozzle forms a sleeve around the electrode.

Furthermore, a consumable wire feed system is generally provided independently of the torch, that is to say it is firmly attached to the torch body or to the torch support, the torch support being the member that connects the torch to the device for moving it.

Conventionally, as shown in FIG. 1, the filler wire is fed into the weld pool by the feed system 3 tangentially or almost tangentially to the liquid metal, at the rear of the electrode 2 surrounded by the nozzle 1, in the welding direction. Under these normal conditions, the angle B defined by the electrode 2 and the filler wire 3 is about 85° to 90°.

However, it turns out in practice that this type of torch is not suitable for robotic TIG welding as it has several drawbacks.

Thus, although the tangential wire feed is perfectly suitable for an automatic TIG welding process in rigs with parallel jaws, the same is not true in robotic welding in which the aspect of space requirement is of paramount importance in order to weld in any position.

However, it will be readily understood that having a consumable-wire feed system that is provided independently of the torch increases the overall size of the assembly, which goes counter to practical use in robotic welding.

In addition, control of the position of the filler wire relative to the welding direction requires the use of an additional axis of the robot, which complicates the unit, increases its cost and is a source of breakdowns.

Moreover, in TIG welding, it is necessary to use a perfectly sharpened, that is to say pointed, electrode in order to obtain a consistent and reproducible result.

To do this, the electrode must be regularly resharpened in order to compensate for its wear, or even completely replaced if its wear has become too great.

This operation requires the operator to stop the machine, remove the electrode, sharpen or replace it, then refit it and, finally, precisely adjust the respective positions of the electrode and the wire so as to relocate the precise position of the wire at the rear of the electrode and tangentially to the welded joint.

It will be understood that this procedure requires the production machine to be stopped one or more times, to the detriment of the expected performance of a robot used in two or three shifts, this procedure being lengthier the more accurate the positioning of the electrode and the wire has to be.

In view of this, the problem presented is to provide an improved wire-guide/nozzle assembly for an electric arc welding torch and an improved automatic TIG welding torch with consumable-wire feed that do not have the abovementioned drawbacks.

In other words, it is an object of the invention to propose a novel torch architecture for TIG welding with filler wire that allows the wire to be easily and precisely positioned relative to the electrode.

SUMMARY OF THE INVENTION

The solution of the invention is a wire-guide/nozzle assembly for an electric arc welding torch, comprising at least one nozzle for delivering gas and at least one wire-guide system for guiding at least one consumable wire, characterized in that the downstream end of the wire-guide system runs into the nozzle.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 5 illustrates one longitudinal section of the invention.
FIG. 6 illustrates a second longitudinal section.

DESCRIPTION OF THE PREFERRED EMBODIMENTS

Depending on the case, the wire-guide/nozzle assembly of the invention may include one or more of the following technical features:
- the peripheral wall of the nozzle has at least one cut-out through which the wire-guide system passes;
- the wire-guide system is fastened to the nozzle;
- the axis of the wire-guide system at its downstream end and the axis of the nozzle make, with each other, an angle between 10° and 70°, preferably around 15° to 45°;
- the wire-guide system is hollow and of oblong general shape, preferably the wire-guide system has the shape of a hollow tube, the internal diameter of which is between 0.6 mm and 2 mm;
- the wire-guide system comprises a part parallel to the axis of the nozzle followed by a curved part, the said parallel part and the said curved part both being located outside the nozzle;
- the distance separating the axis of the parallel part of the wire-guide system from the axis of the nozzle is less than 30 mm;
- the nozzle includes attachment means for attaching it to a welding torch, preferably the attachment means comprise a thread provided on the outer peripheral wall of the nozzle.

According to another aspect, the invention also relates to a TIG welding torch equipped with such a wire-guide/nozzle assembly.

Preferably, the torch furthermore includes a non-consumable electrode placed relative to the wire-guide/nozzle assembly in such a way that the wire conveyed by the wire guide penetrates the nozzle, going towards the electrode at an angle between 5° and 50°, preferably between 10° and 30°, to the axis of the electrode or of the nozzle, the wire and the electrode lying in one and the same plane.

The torch also includes a mounting onto which the wire-guide/nozzle assembly is fitted in a predefined position.

According to yet another aspect, the invention relates to a robotic welding unit comprising at least one robotic arm provided with such a torch.

Figure 1:
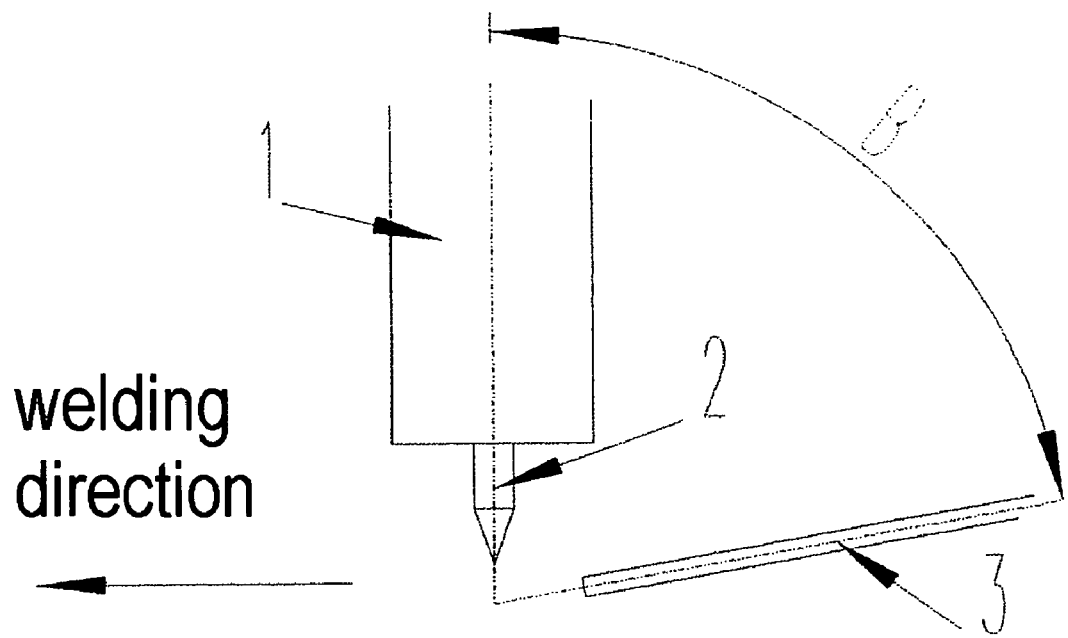
FIG. 1 illustrates the prior art.
Figure 2:
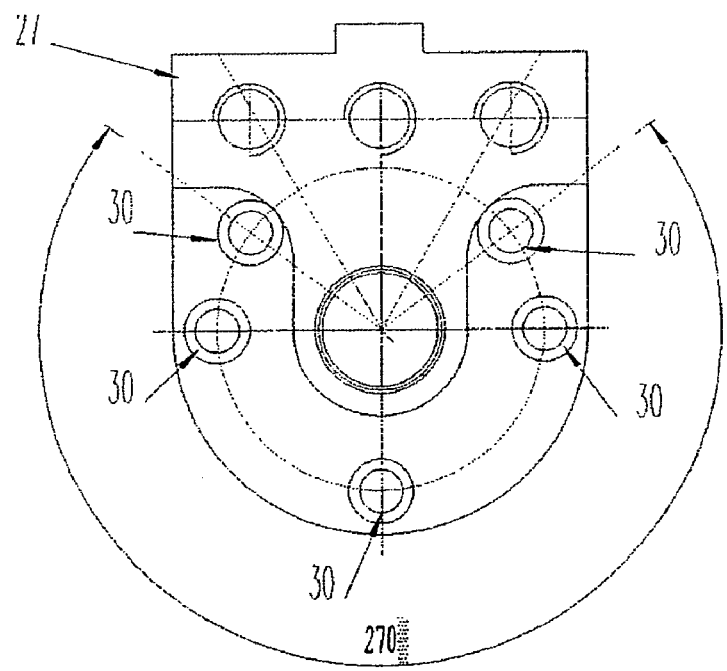
FIG. 2 illustrates the invention.
Figures 3, 4:
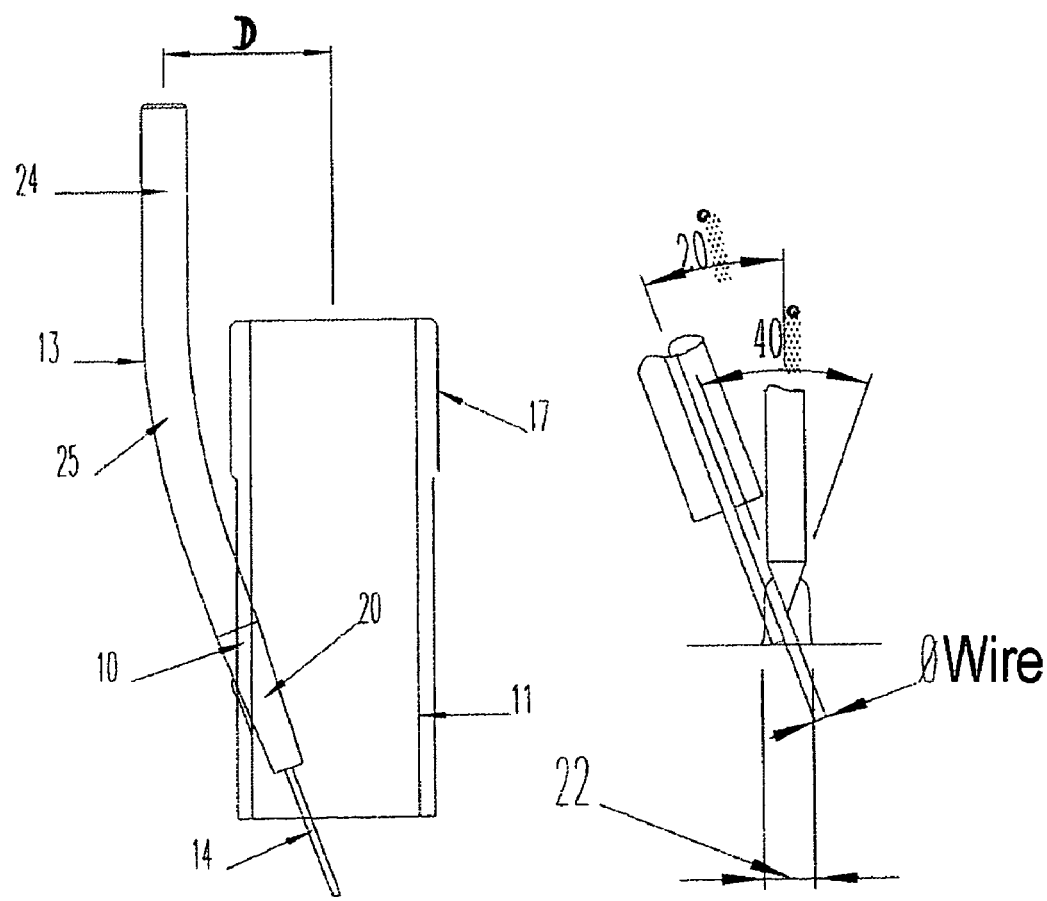
FIG. 3 illustrates one side view of the invention.
FIG. 4 illustrates a second side view.
Figure 7:
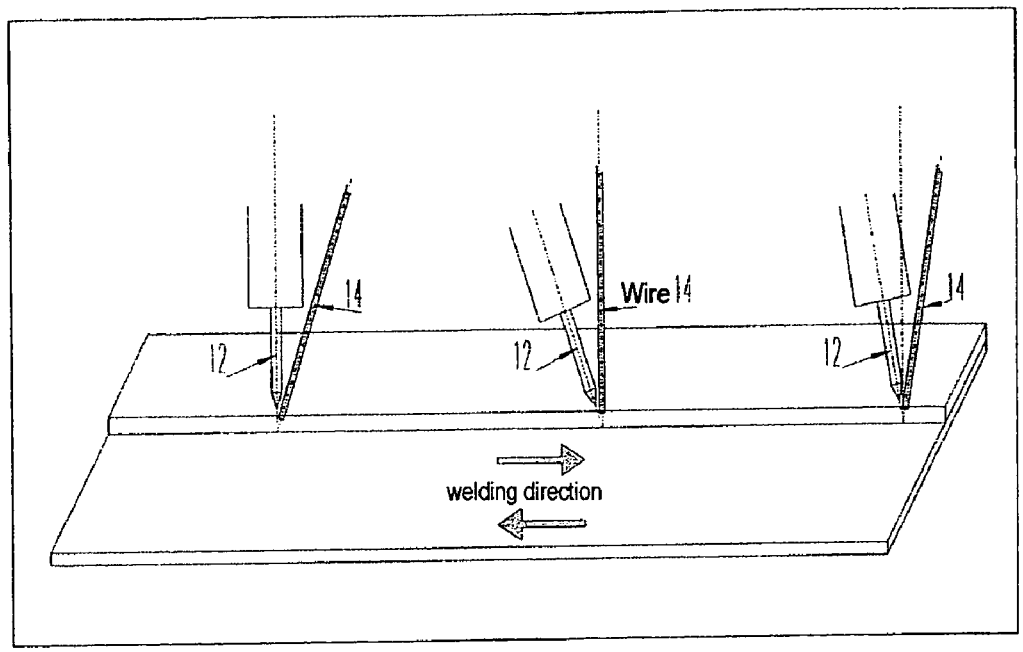
FIG. 7 illustrates one possible orientation of the wire-guide/nozzle
Figure 8:
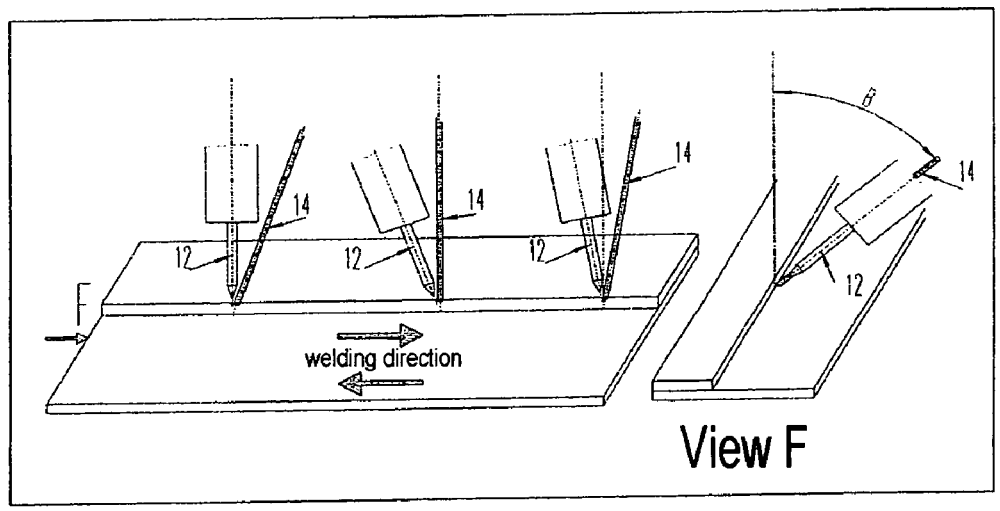
FIG. 8 illustrates a second orientation.
Figure 9:
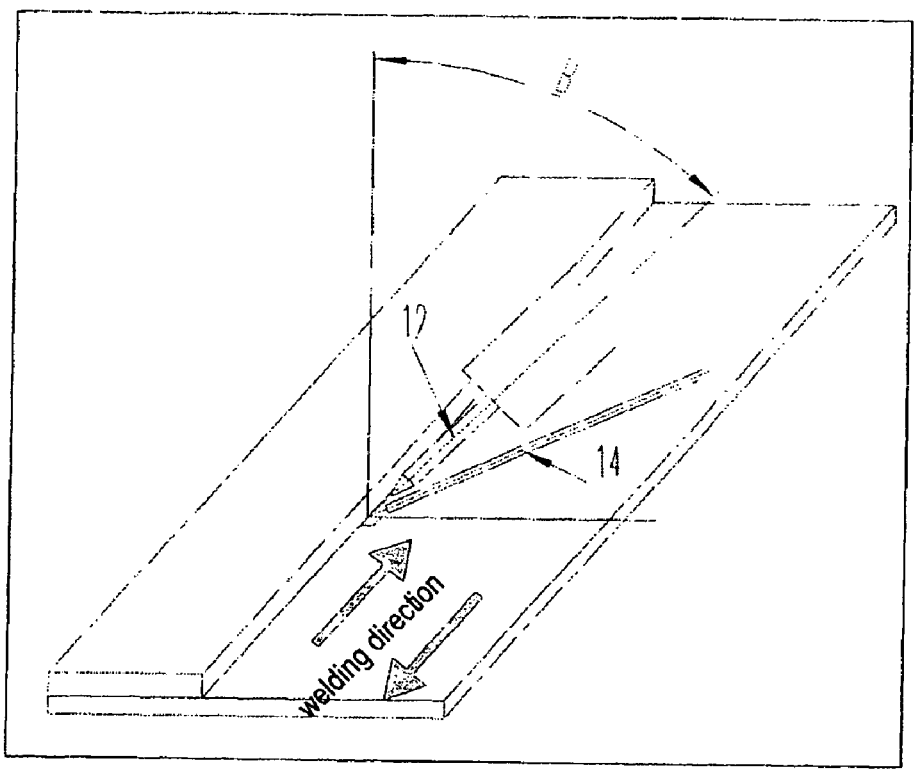
FIG. 9 illustrates a third orientation.

The invention will now be explained in greater detail with reference to the appended figures, in which:

FIG. 1 shows a side view of a wire feed configuration for a TIG torch according to the prior art;

FIG. 2 shows a top view of the mounting for a TIG torch according to the invention;

FIGS. 3 and 4 show schematically, in side view, a wire-guide/nozzle assembly for an electric arc welding torch according to the invention;

FIGS. 5 and 6 are longitudinal sections through a torch according to the invention; and FIGS. 7 to 9 show schematically the possible orientations of the wire-guide/nozzle assembly of a torch according to the invention.

An arc welding torch according to the invention is made up of three main subassemblies, namely a torch support or mounting 27, a torch body 16 and a nozzle 11 incorporating a wire-guide system 13 and forming a one-piece wire-guide/nozzle assembly.

The torch support or mounting supports all the fluid inlets, especially for the supply and return of the coolant (water); the inlet for the gas or gases needed to implement the welding process; the connection for the electrical power via one or more power cables, these being solid or liquid- or gas-cooled, their method of attachment depending on the cable in question; and the inlet for the filler-wire guiding sheath, the latter coming in parallel to the geometrical axis of the torch, defined by the electrode.

The mounting 27 is fastened to the wrist of a robot system by means of a suitable mechanical component, which is itself mounted on a "shock-proof" safety device.

The mounting 27 receives, on the one hand, the torch body 16 subassembly, to which the mounting delivers the fluids, that is to say the gas and the cooling water, and also the electrical power via a contact socket intended to provide the electrical contact needed to implement the welding process, and, on the other hand, the wire-guide 13/nozzle 11 subassembly to which the mounting delivers the filler metal, that is to say the consumable welding wire 14.

The design of the mounting 27 allows the wire-guide 13/nozzle 11 subassembly to be positioned concentrically with the torch body 16 subassembly in a position 30 chosen beforehand according to the welding operation to be carried out, these various positions 30 being distributed over a 270° ring, as shown diagrammatically in FIG. 2.

As shown in FIGS. 5 and 6, the torch body 16 receives the pure or thoriated tungsten electrode 12 produced in a cylindrical sintered tungsten rod, sharpened at one of its ends.

The electrode 12 is held centred by a conventional retention system, such as a push- or pull-operated gripper system, an interlocking system or the like.

The electrode 12 may also be made up of two components, namely a support made of a copper alloy that supports a force-fitted, crimped or brazed part made of pure or thoriated tungsten. In this case, the electrode then becomes a consumable electrode that is replaced when it is worn out.

The torch body 16 may or may not be cooled by cooling liquid circuits (duct 23) made in the torch support.

The torch body 16 may also be equipped with an additional, central gas circuit—it is then equipped with an external nozzle placed around the nozzle 11 in order to implement a dual-flow TIG process.

The torch body 16 is inserted into the torch support or mounting 27 coming into abutment (at 30) on a shoulder 31 of the said torch body 16, which shoulder 31 serves as a reference point for the position along the Z access. Once the torch body has been placed in abutment thereon, it may be locked to the torch support 27 by a suitable mechanical device in order to keep it in position, for example a locking ring, a cotter pin system or the like.

The wire-guide 13/nozzle 11 assembly is made up of a nozzle 11 and a wire-guide system 13 that are fastened together, for example by brazing, screwing, bonding or welding.

As shown in detail in FIGS. 3 and 4, the nozzle 11 is a hollow metal component of cylindrical general shape, which may or may not be cooled by a cooling liquid coming from the torch support 27 depending on the power of the torch.

The nozzle 11 is fastened to the torch support 27 so as to be concentric with the torch body 16, from which it is electrically isolated.

An axial adjustment device 15 allows the wire-guide 13/nozzle 11 assembly to be precisely positioned relative to the electrode 12. The adjustment device 15 comprises, for example, a tapped ring 15 that cooperates with a part 18 of the torch body 16 and a thread 17 on the external peripheral wall of the upstream end of the nozzle 11.

The nozzle 11 receives the wire guide 13 for conveying the welding wire 14.

The wire guide 13 is in the form of a tubular element, the inside diameter of which depends on the diameter of the wire 14 used.

The wire guide 13 runs along the outside of the nozzle 11 a short distance D from the said nozzle 11, being positioned parallel to the latter, typically at a distance D of less than or equal to about 30 mm, as shown in FIG. 3. The distance D is the distance between the axis of the nozzle 11 and the axis of the tube 13 taken outside the nozzle 11 in the region of that portion (part 24) of the wire guide 13 that is parallel or almost parallel to the axis of the nozzle 11, as may be seen in FIG. 3.

The tubular element 13 used for conveying the wire is bent (part 25) with a radius sufficient to allow semi-rigid wires 14 to pass through it without jamming or excess friction, and it is also profiled at its downstream end 20 facing the electrode 12.

The wire guide 13 is inserted into the nozzle 11 via a machined housing or cut-out 10 so that the wire 14 penetrates the nozzle 11, in the direction of the electrode 12, preferably at an angle of between 10° and 30° to the axis passing through the electrode 12 or the nozzle 11, the wire 14 and the electrode 12 lying in the same plane.

The geometry of the wire-guide 13/nozzle 11 assembly is such that the terminal part is minimal, that is to say the unguided part of the wire at the point where it leaves the wire guide as shown in FIG. 4—the downstream end 20 of the wire guide 13 must in no case come into mechanical contact with the electrode 12 or the torch body 16, as shown in FIGS. 3 and 4.

The end of the filler wire 14 enters the anode spot 22 created by the electric arc during implementation of the TIG process, irrespective of the arc voltage obtained for a gas corresponding to a given work height.

The filler wire 14 must be delivered in such a way that the end of the said wire 14 grazes a sharpened end of the electrode 12, that is to say approaches it to within a distance that must preferably not be less than the diameter of the filler wire 14.

The torch of the invention is therefore of one-piece form, that is to say a TIG torch with a wire-guide system 13 partly integrated into the nozzle 11, and therefore does not require an additional axis to guide the wire 14 relative to the plane of the joint to be produced, making it very practical to integrate into a robotic welding arm.

The presetting of the electrode 12 in the electrode holder 19 and the adjusting of the nozzle 11 with the integrated wire guide 13 ensure that the wire 14 is precisely positioned relative to the electrode 12 in such a way that it always arrives in the anode spot of the arc.

The preset electrode holder 19 allows this module to be rapidly changed without the need for resetting along the Z axis of the robot.

The electrode holder 19 may be arranged so as to shield the electrode 12 with a shielding gas and therefore provide operating conditions similar to those of a TIG welding process with two concentric gas streams.

Moreover, the torch may operate in arc-voltage self-regulation mode, this being ensured directly by the robot.

Furthermore, the torch may also be equipped with an industrial joint-monitoring system of the mechanical or optical type, for example one using a laser with a CCD (Charge Coupled Device) camera.

The wire pay-out device may operate continuously or alternately, depending on the applications and the technologies that are available.

Welding trials have demonstrated that the welding assembly comprising the robotic torch described above can work in various geometrical positions in space.

If we consider the wire/electrode plane and the angle that the wire 14 makes with the electrode 12, the assembly is capable of working in the configurations shown in FIGS. 7 to 9, namely:

the vertical wire/electrode plane in the welding direction (FIG. 7) with either the electrode vertical and the wire coming in at the side at a fixed defined angle (diagram on the left in FIG. 7), or with the wire coming in vertically and the electrode being inclined to the side at a fixed defined angle (diagram in the middle of FIG. 7) or with the vertical axis passing through the bisector of the angle between the axis of the wire and the axis of the electrode (diagram on the right in FIG. 7);

wire/electrode plane inclined at an angle B (cf. FIG. 8, ranging from 0° to 90° relative to the vertical axis in the welding direction) with either the electrode vertical and the wire coming in at the side at the fixed defined angle (diagram on the left in FIG. 8), or the wire coming in vertically and the electrode being inclined to the side at the fixed defined angle (diagram in the middle of FIG. 8) or the vertical axis passing through the bisector of the angle between the wire and the electrode (diagram on the right in FIG. 8). All these angles accept a wide tolerance of approximately ±5°. Irrespective of the configuration adopted, the wire is preferably delivered behind the electrode 12 in the direction of advance of the welding, but the reverse position, that is to say with the wire coming in ahead of the electrode in the direction of advance, can also be used; and wire/electrode plane perpendicular to the welding direction (see FIG. 9) with either the electrode vertical and the wire coming in at the same side at the construction angle, or with the electrode inclined at a variable angle B, which may be up to 45°.

The current delivered by the welding power supply may be a pulsed or unpulsed DC current in the case of carbon or stainless steels and nickel-, titanium/zirconium- and tantalum-based alloys, or an AC or variable-polarity current for welding aluminium- or magnesium-based light alloys.

Moreover, the pay-out of the filler wire 14 used in the torch may be continuous or pulsed by a movement rate-regulated for example by a mechanical device of the connecting rod, crank or other type of mechanical device, or by an electronic device for controlling the pay-out motor.

As already mentioned, the torch of the invention may be designed to operate in a TIG welding process of the single or dual gas flow type.

The welding torch of the invention can be used to join together, by welding or braze-welding, various elements consisting of metal sheets or plates ranging in thickness from 0.5 mm to 4 mm made of carbon steel, both uncoated and coated (galvanized or electrogalvanized), made of ferritic or austenitic stainless steel, or made of an aluminium or magnesium light alloy.

Depending on the envisaged use, the filler wire may be made of non-alloy or low-alloy steel, ferritic or austenitic stainless steel, nickel or nickel alloy, pure copper or copper alloy, or aluminium or aluminium alloy.

The welding torch of the invention is designed so as to be able to fit into an automated welding robot for welding a very wide variety of components or workpieces, especially workpieces intended for the automobile industry, especially aluminium or aluminium alloy bodies or body components, bonnets, boot lids, doors and floor connections and ferritic or austenitic stainless steel exhaust systems, but also for other industries such as the motorcycle industry, especially for welding aluminium or aluminium alloy bike frames, or else for manufacturing steel or light alloy scaffolding or ladders.

The torch of the invention can be used more generally for carrying out any welding operation that requires an attractive weld bead to be obtained.

Element names are provided to assist in cross-reference to the FIGS.:

Downstream end 20 is the First Section.

Part 24 parallel to the axis of the nozzle is the Second Section.

Curved part 25 is the Third Section.

As an example, a torch according to the invention can produce quality welds under the conditions given in the following table.

TABLE

| Material | Thickness (in mm) | I (A) | U (V) | Standard DC current | Gas | $V_{weld}$ | $V_{wire}$ | Wire | Welding configuration |
|---|---|---|---|---|---|---|---|---|---|
| Stainless Steel | 1 | 120 | 13 | Smooth | Arcal 31 | 1 | 1.8 | Nertalic 50 01 | Lap weld |
| Bare steel | 1 | 150 | 11.5 | 30 Hz Pulsed | Noxal 2 | 1 | 2.7 | Nertalic 46 CuAl8 01 | Lap weld |
| Galvanized steel | 1 | 150 | 12.5 | 30 Hz Pulsed | Noxal 2 | 12 | 2.7 | Nertalic 46 CuAl8 01 | Lap weld |

Arcal 31 is a gas sold by Air Liquide, consisting of 95% argon + 5% helim (% by volume);
Noxal 2 is a gas sold by Air Liquide, consisting of 97.5% argon + 2.5% hydrogen;
Nertalic 50 is a wire sold by La Soudure Autogène Francaise of the low-carbon stainless steel type according to the AFNOR 81-313, DIN 1.4316 or AWS ER308Lsi standard; and
Nertalic 46 is a wire sold by La Soudure Autogène Francaise of the copper-aluminium (CuAl8) type according to the DIN 1733 or AWS A5-7 standard.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A robotic welding unit, comprising at least one robotic arm comprising a TIG welding torch with a tungsten electrode which has a sharpened end, said torch further comprising at least one wire guide/nozzle assembly for an electric arc welding torch, comprising:
    a) at least one nozzle for delivering gas, said nozzle comprising a first axis longitudinally oriented with said nozzle; and
    b) at least one wire-guide system for guiding at least one consumable wire which has a fusible extremity, said wire-guide system comprising a first section, said first section comprising the downstream end of said wire-guide system, said first section further comprising a second axis longitudinally oriented with said first section,
    wherein said downstream end directs said consumable wire into said nozzle,
    wherein said fusible extremity of consumable wire and said tungsten electrode lie in one and the same plane,
    wherein said nozzle further comprising a peripheral wall, said peripheral wall having at least one cut-out through which said wire-guide system passes,
    wherein said first axis and said second axis are oriented at an angle between about 5° and about 50° relative to each other, and
    wherein said wire is guided in such a manner that an end of said wire grazes said sharpened end of said tungsten electrode and then enters into an electrical snot created by said tungsten electrode on at least one piece to be welded.

2. The unit of claim 1, wherein said wire-guide system is fastened to said nozzle.

3. The unit of claim 1, wherein said first axis and said second axis are oriented at an angle between about 15° and about 45° relative to each other.

4. The unit of claim 1, wherein said wire-guide system is hollow and generally oblong shaped.

5. The unit of claim 1, wherein said wire-guide system has the shape of a hollow tube, said hollow tube having an internal diameter between about 0.6 mm and about 2 mm.

6. The unit of claim 1, wherein said wire-guide system further comprises a second section parallel to said first axis contiguous with a third section, said third section comprising a curved part, wherein said second section and said third section are located outside said nozzle.

7. The unit of claim 1, wherein said second section comprises third axis, the distance separating said third axis from said first axis being less than about 30 mm.

8. The unit of claim 1, wherein said nozzle further comprises attachment means for attaching said nozzle to the welding torch.

9. The unit of claim 8, wherein said attachment means comprises a thread provided on the outer peripheral wall of said nozzle.

10. The unit of claim 1, wherein said first axis and said second axis are oriented at an angle between about 10° and about 30°.

11. A robotic process for welding or braze-welding two metallic pieces together comprising the steps of:
    a) providing a robotic welding unit with a robotic arm equipped with a TIG torch of claim 1, wherein said TIG torch comprises a TIG electrode with a sharpened end;
    b) feeding the TIG torch with a wire;
    c) guiding the wire in such manner that the end of said wire grazes the sharpened end of the tungsten electrode and then enters into the electrical spot created by means of the tungsten electrode on at least one of the pieces to be welded together by the electric arc; and
    d) fusing the wire thereby welding or braze-welding the metallic pieces together.

12. The robotic process of claim 1, wherein the pieces are metal sheets or plates having a thickness from between 0.5 mm to 4 mm.

13. The robotic process of claim 1, wherein the pieces are made of carbon steel, stainless steel, or aluminum or magnesium light alloys.

14. The robotic process of claim 12, wherein the pieces are coated.

15. The robotic process of claim 1, wherein the filler wire is made of steel, stainless steel, aluminum or aluminum alloy, nickel or nickel alloy, or copper or copper alloy.

* * * * *

UNITED STATES PATENT AND TRADEMARK OFFICE
CERTIFICATE OF CORRECTION

| | |
|---|---|
| PATENT NO. | : 7,078,646 B2 |
| APPLICATION NO. | : 10/798761 |
| DATED | : July 18, 2006 |
| INVENTOR(S) | : André Borne and Jean-Marie Fortain |

It is certified that error appears in the above-identified patent and that said Letters Patent is hereby corrected as shown below:

Column 8, line 6, replace the word "snot" with --spot--.
Column 9, line 1, replace the words "claim 1" with --claim 11--.
Column 9, line 4, replace the words "claim 1" with --claim 11--.
Column 10, line 3, replace trhe words "claim 1" with --claim 11--.

Signed and Sealed this

Seventeenth Day of October, 2006

JON W. DUDAS
*Director of the United States Patent and Trademark Office*